United States Patent
Wei et al.

(10) Patent No.: US 7,140,357 B2
(45) Date of Patent: Nov. 28, 2006

(54) VORTEX MIXING SYSTEM FOR EXHAUST GAS RECIRCULATION (EGR)

(75) Inventors: Puning Wei, Naperville, IL (US); Zhengbai Liu, Naperville, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 0 days.

(21) Appl. No.: 10/945,636

(22) Filed: Sep. 21, 2004

(65) Prior Publication Data

US 2006/0060173 A1    Mar. 23, 2006

(51) Int. Cl.
*F02M 25/07*    (2006.01)
(52) U.S. Cl. .................................. 123/568.17
(58) Field of Classification Search ........... 123/568.15, 123/568.11, 568.17, 568.18, 568.19
See application file for complete search history.

(56) References Cited

U.S. PATENT DOCUMENTS

| | | | |
|---|---|---|---|
| 3,273,550 A * | 9/1966 | Ball ............................ 123/572 |
| 4,014,639 A * | 3/1977 | Froehlich ..................... 431/353 |
| 4,027,635 A * | 6/1977 | Goto et al. ............ 123/568.15 |
| 4,132,247 A * | 1/1979 | Lindberg ..................... 137/806 |
| 4,270,508 A * | 6/1981 | Lindberg ................... 123/25 A |
| 4,609,342 A * | 9/1986 | Showalter ....................... 431/2 |
| 5,881,756 A * | 3/1999 | Abbasi et al. ................. 137/9 |
| 6,003,315 A | 12/1999 | Bailey |
| 6,148,805 A | 11/2000 | Bartley et al. |
| 6,233,936 B1 | 5/2001 | Hakansson |
| 6,244,256 B1 | 6/2001 | Wall et al. |
| 6,324,847 B1 | 12/2001 | Pierpont |
| 6,347,519 B1 | 2/2002 | Kreso |
| 6,354,084 B1 | 3/2002 | McKinley et al. |
| 6,360,732 B1 | 3/2002 | Bailey et al. |
| 6,367,256 B1 | 4/2002 | McKee |
| 6,378,515 B1 | 4/2002 | Geyer |
| 6,408,833 B1 | 6/2002 | Faletti |
| 6,412,279 B1 | 7/2002 | Coleman et al. |
| 6,425,382 B1 * | 7/2002 | Marthaler et al. ...... 123/568.17 |
| 6,427,671 B1 | 8/2002 | Holze et al. |
| 6,439,210 B1 | 8/2002 | Faletti et al. |
| 6,478,017 B1 | 11/2002 | Bianchi |
| 2005/0161028 A1 * | 7/2005 | Wolters ....................... 123/527 |

* cited by examiner

*Primary Examiner*—Willis R. Wolfe
*Assistant Examiner*—Arnold Castro
(74) *Attorney, Agent, or Firm*—Susan L. Lukasik; Elias P. Soupos; Dennis K. Sullivan

(57) ABSTRACT

A vortex mixing system mixes intake air with exhaust gases for exhaust gas recirculation (EGR) in an internal combustion engine. The vortex mixing system may have a vortex mixing device connected to an intake air conduit, a supply conduit, and an EGR conduit. The vortex mixing device may have a plenum disposed around a mixing conduit, which is connected to the intake air conduit and the supply conduit. The plenum is connected to one or more cross conduits and to the EGR conduit. The cross conduits extend across a mixing chamber formed by the mixing conduit. The cross conduits generate one or more vortices in the intake air. Each cross conduit has one or more outlets. The cross conduits direct the exhaust gases through the outlets into the vortices. The exhaust gases mix with the intake air in the vortices.

12 Claims, 6 Drawing Sheets

VORTEX MIXING SYSTEM FOR EXHAUST GAS RECIRCULATION (EGR)

CROSS REFERENCE TO RELATED APPLICATIONS

Related applications include the following commonly assigned U.S. patent applications that have been filed on the same day as this application:

U.S. patent application Ser. No. 10/945,591, entitled "Two Stage Mixing System for Exhaust Gas Recirculation (EGR)," and filed on Sep. 21, 2004; and U.S. patent application Ser. No. 10/945,618, entitled "Venturi Mixing System for Exhaust Gas Recirculation (EGR)," and filed on Sep. 21, 2004.

FIELD OF THE INVENTION

This invention generally relates to exhaust gas recirculation (EGR) systems in internal combustion engines. More particularly, this invention relates to EGR systems that have a mixing device to combine exhaust gases with intake air for combustion in the cylinders of an internal combustion engine.

BACKGROUND OF THE INVENTION

Internal combustion engines convert chemical energy from a fuel into mechanical energy. The fuel may be petroleum-based (gasoline or diesel), natural gas, a combination thereof, or the like. Some internal combustion engines, such as gasoline engines, inject an air-fuel mixture into one or more cylinders for ignition by a spark from a spark plug or the like. Other internal combustion engines, such as diesel engines, compress air in the cylinder and then inject fuel into the cylinder for the compressed air to ignite. A diesel engine may use a hydraulically activated electronically controlled unit injection (HEUI) system or the like to control the fuel injection into the cylinders. The ignited fuel generates rapidly expanding gases that actuate a piston in the cylinder. Each piston usually is connected to a crankshaft or similar device for converting the reciprocating motion of the piston into rotational motion. The rotational motion from the crankshaft may be used to propel a vehicle, operate a pump or an electrical generator, or perform other work. The vehicle may be a truck, an automobile, a boat, or the like.

Many internal combustion engines use exhaust gases to reduce the production of nitrogen oxides ($NO_X$) during the combustion process in the cylinders. These internal combustion engines typically mix a portion of the exhaust gases with the intake air for combustion in the cylinders. The exhaust gases usually lower the combustion temperature of the fuel below the temperature where nitrogen combines with oxygen to form $NO_X$.

There are various approaches for mixing the exhaust gases with the intake air in an internal combustion engine. Some internal combustion engines control the opening and closing of exhaust and intake valves in a cylinder. The opening and closing of the valves may trap and push some exhaust gases from the cylinder into the intake manifold for mixing with the intake air. Other internal combustion engines use an exhaust gas recirculation (EGR) system to divert a portion of the exhaust gases exiting the cylinders for mixing with the intake air to the cylinders.

Many EGR systems divert a portion of the exhaust gases from the exhaust manifold to the intake manifold of the engine. The exhaust manifold generally is an accumulation chamber above the cylinders that gathers the exhaust gases for expulsion from the vehicle. The intake manifold generally is another chamber above the cylinders that holds a combustion gas for the cylinders. The combustion gas may be all intake air or a combination of intake air and exhaust gases. The amount of exhaust gases in the combustion gas may vary during engine operation. The internal combustion engine may have a by-pass pipe to supply intake air directly to the intake manifold without exhaust gases.

EGR systems usually have an EGR conduit or pipe connected to the exhaust manifold. The EGR conduit may be a channel formed by the cylinder head or other engine component, a pipe or tube outside the cylinder head, a combination thereof, or the like. The EGR conduit may direct the exhaust gases through a gas trap and a gas cooling device prior to mixing the exhaust gases with the intake air. The gas trap usually is cleaning device for removing particulate from the exhaust gases. The gas cooling device may be a heat exchanger or other device for removing heat from the exhaust gases. The gas cooling device may use coolant from the engine cooling system, a separate cooling system, or a combination thereof. Some EGR systems have an orifice or other pressure measurement device to measure the exhaust gas flow through the EGR conduit.

Many EGR systems may have a control valve connected between the EGR conduit and the exhaust manifold. The engine controller or another microprocessor usually activates the control valve to adjust the flow of exhaust gases through the EGR conduit to achieve a selected concentration of exhaust gases in the intake air. The selected concentration of exhaust gases may vary during engine operation. The control valve may be actuated using a vacuum, a hydraulic fluid such as the hydraulic fluid used in fuel injectors, or the like. Some EGR systems open the control valve only when the pressure of the exhaust gases is higher than the pressure of the intake air. Some EGR systems have a valve in the exhaust duct to restrict the exhaust flow from the engine. The restricted flow increases the back pressure of the exhaust gases. The valve may open or close to control the amount of back pressure and thus may control the flow of exhaust gases into the intake air.

Many EGR systems have a mixing device at the connection of the EGR conduit with the intake conduit that supplies intake air for the cylinders. The intake conduit may be connected to the output of a compressor that pressurizes the intake air. The mixing device typically combines exhaust gases from the EGR conduit with intake air from the intake conduit to form the combustion gas for the cylinders. During engine operation, the exhaust gases usually flow into the intake air when the pressure of the exhaust gases is greater than the pressure of the intake air. The intake air pressure may vary especially when a turbocharger is used.

The mixing device typically is a pipe or other union between the EGR conduit and the intake conduit. The EGR and intake conduits may form a "tee" or similar connection. The mixing device may form a mixing chamber. The EGR conduit and/or intake conduit may expand to form the mixing chamber at the connection. The mixing device mixes the exhaust gases with the intake air to form the combustion gas. The mixing device usually supplies the combustion gas to the intake manifold through a supply pipe or conduit.

The mixing device may have an EGR conduit that extends into the intake conduit. The EGR conduit may create an obstacle that separates the intake air into two streams, each passing on an opposite side of the EGR conduit. The exhaust gas exits the EGR conduit and enters into a region of the mixing device where the two streams are essentially absent.

The two intake air streams combine with each other and with the exhaust gases downstream from the EGR conduit.

The mixing device may have a venturi for combining the exhaust gases with the intake air. The venturi typically forms part of the intake conduit. The venturi usually has an inlet connected to an outlet by a nozzle or throat. The inlet and outlet have larger diameters than the throat. The diameter of the intake conduit tapers down from the inlet to the throat and then tapers up from the throat to the outlet. The EGR conduit connects to the throat. The inlet may be connected to the compressor output of a turbocharger. The outlet is connected to the supply conduit for providing the combustion gas to the intake manifold.

In operation, the venturi creates a pressure drop in the intake air passing through the throat. The smaller diameter of the throat increases the velocity of the intake air. The increase in velocity lowers the pressure of the intake air in throat. The lower pressure of the intake air increases the amount of exhaust gases that can enter the throat for mixing with the intake air to form the combustion gas. At the outlet, the larger diameter decreases the velocity of the combustion gas. The decrease in velocity increases the pressure of the combustion gas.

Many mixing devices may not adequately blend the intake air with the exhaust gases to form a combustion gas with an essentially uniform dispersion of the exhaust gases in the intake air. While the exhaust gases and intake air are combined, there may be an uneven dispersion of the exhaust gases in the intake air. The uneven dispersion may include pockets, zones, regions, or strata of higher or lower concentrations of exhaust gases than the selected concentration of exhaust gases in the intake air. The dispersion may be more uneven when the exhaust gases enter on one side of the intake air stream. The selected concentration of exhaust gases in the intake air may be reduced to avoid or reduce the effects of the uneven dispersion on engine operation. Internal combustion engines may produce more $NO_X$ at the lower selected concentrations of exhaust gases in the intake air.

SUMMARY

This invention provides a vortex mixing system for exhaust gas recirculation (EGR) in an internal combustion engine. The vortex mixing system generates one or more vortices in the intake air for the engine. The vortex mixing system directs a portion of the exhaust gases from the engine into the vortices. The exhaust gases mix with the intake air in the vortices.

A vortex mixing system may have a vortex mixing device, an intake air conduit, a supply conduit, and an EGR conduit. The intake air conduit is connected to the vortex mixing device. The supply conduit is connected to the vortex mixing device. The EGR conduit is connected to the vortex mixing device. The vortex mixing device generates one or more vortices in the intake air from the intake air conduit. The vortex mixing device directs exhaust gases from the EGR conduit into the vortices. The vortex mixing device provides a combustion gas to the supply conduit.

A vortex mixing system may have a mixing conduit, and intake air conduit, a supply conduit, a plenum, an EGR conduit, and one or more cross conduits. The mixing conduit forms a mixing chamber. The intake air conduit is connected to the mixing conduit. The supply conduit is connected to the mixing conduit. The plenum is disposed on the circumference of the mixing conduit. The plenum forms an annular cavity. The EGR conduit is connected to the plenum. The cross conduits are disposed across the mixing chamber. Each cross conduit is connected at both ends to the plenum. Each cross conduit has an upstream side and a downstream side. The upstream side faces the intake air conduit. The downstream side faces the supply conduit. Each cross conduit forms at least one outlet on the downstream side.

A vortex mixing device may have a mixing conduit, a plenum, and one or more cross conduits. The mixing conduit forms a mixing chamber. The plenum is disposed on the circumference of the mixing conduit. The plenum forms an annular cavity. The cross conduits are disposed across the mixing chamber. Each cross conduit is connected at both ends to the plenum. Each cross conduit has an upstream side and a downstream side. Each cross conduit forms at least one outlet on the downstream side.

In a method for mixing exhaust gases with intake air in an internal combustion engine, one or more vortices are generated in the intake air. The exhaust gases are directed into the vortices.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
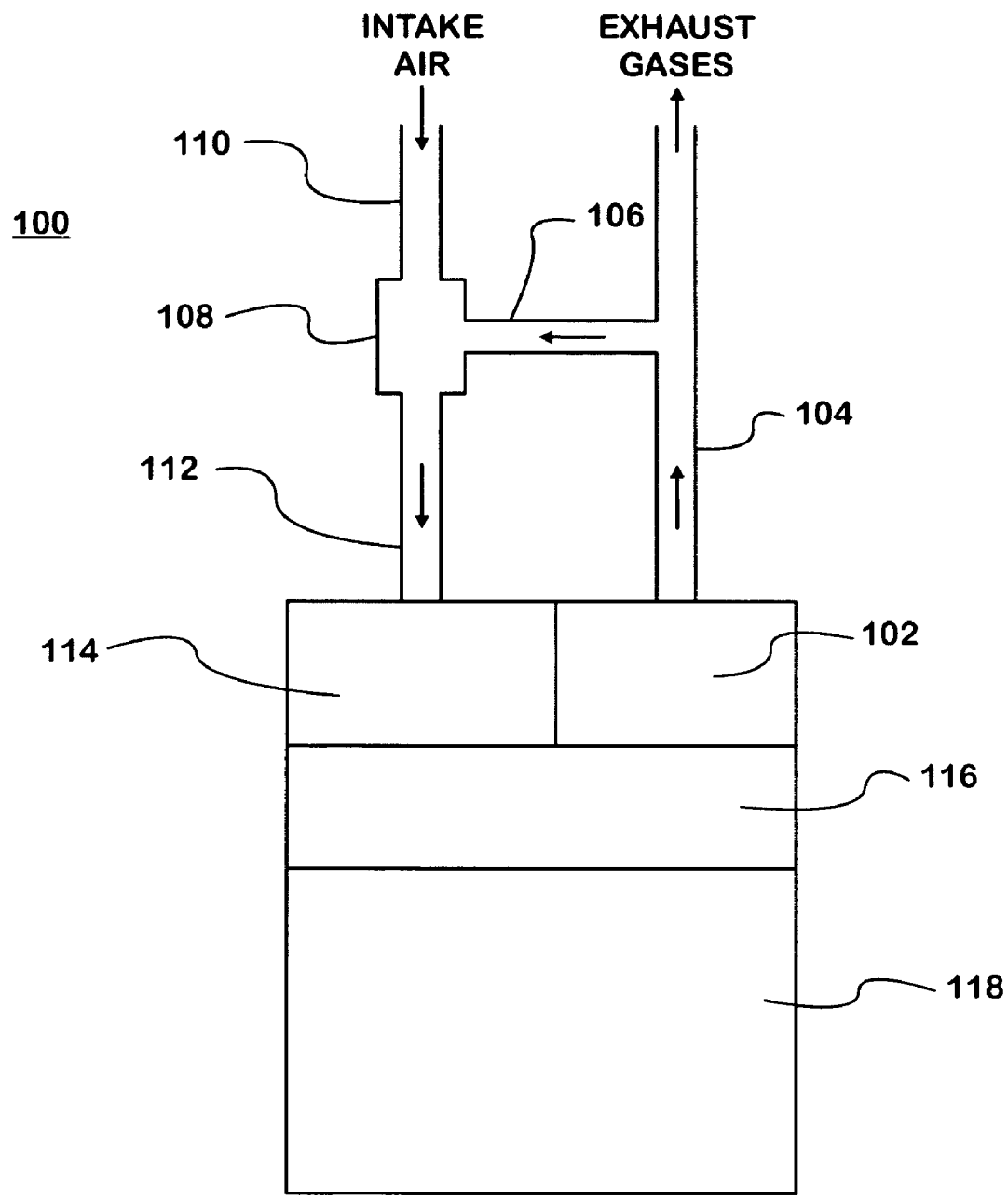
FIG. 1 is a schematic view of a vortex mixing system for exhaust gas recirculation (EGR) on an internal combustion engine.

FIG. 1 is a schematic view of an internal combustion engine 100 with a vortex mixing system for exhaust gas recirculation (EGR). Exhaust gases from the internal combustion engine 100 flow through an exhaust manifold 102 into an exhaust conduit 104. The internal combustion 100 engine diverts a portion of the exhaust gases from the exhaust conduit 104 through an exhaust gas recirculation (EGR) conduit 106 into a vortex mixing device 108. Intake air for the combustion of fuel in the internal combustion engine 100 flows through an intake air conduit 110 into the vortex mixing device 108. The vortex mixing device 108 generates one or more vortices in the intake air and directs the exhaust gases into the vortices. The exhaust gases mix with the intake air in the vortices to form a combustion gas for the combustion of fuel in the internal combustion engine 100. The combustion gas flows from the vortex mixing device 108 through a supply conduit 112 into the intake manifold 114 of the internal combustion engine 100. While a particular configuration is shown, the internal combustion engine 100 with a vortex mixing system may have other configurations including those with additional components.

The internal combustion engine 100 has a cylinder head 116 connected to a crankcase 118. The exhaust manifold 102 and the intake manifold 114 are disposed adjacent to the cylinder head 116. The crankcase 118 forms one or more cylinders (not shown) arranged in an in-line, Vee, or other configuration. There may be multiple cylinder heads each with intake and exhaust manifolds such as when the cylinders are arranged in separate banks as in Vee or like configurations. During engine operation, the combustion gas flows from the intake manifold 114 into the cylinders. The combustion gas may comprise all intake air or a mixture of intake air and exhaust gases. The combustion gas may have a selected concentration of exhaust gases in the intake air. Selected concentration includes the percentage of exhaust gases in the combustion gas, a ratio of the amount of exhaust gases to the amount of intake air, or the like. The selected concentration may vary during engine operation. The combustion gas ignites fuel in the cylinders. The exhaust gases from the combustion of fuel flow from the cylinders into the exhaust manifold 102.

The exhaust manifold 102 connects to the exhaust conduit 104. The EGR conduit 106 connects the exhaust conduit 104 to the vortex mixing device 108. The EGR conduit 106 may have other components such as a gas cooler (not shown) and a gas trap (not shown). A control valve (not shown) may connect the EGR conduit 106 to the exhaust conduit 104. An engine controller (not shown) may operate the control valve to provide the selected concentration of exhaust gases in the combustion gas.

The vortex mixing device 108 is connected to the intake air conduit 110. The supply conduit 112 connects the vortex mixing device 108 to the intake manifold 114. The internal combustion engine 100 may have an intake air bypass (not shown) connecting the intake air conduit 110 directly to the supply conduit 112. The intake air bypass may provide intake air directly to the intake manifold 114 without exhaust gases.

The internal combustion engine 100 may have a turbocharger (not shown). The exhaust conduit 104 may connect to the turbine inlet of the turbocharger. The intake air conduit 110 may connect to the compressor outlet of the turbocharger.

During operation of the internal combustion engine 100, exhaust gases flow through the exhaust manifold 102 into the exhaust conduit 104. A portion of the exhaust gases is diverted through the EGR conduit 106 and into the vortex mixing device 108. The remaining exhaust gases may pass through the turbine of a turbocharger or another engine component prior to exiting. The intake air flows through the intake air conduit 110 into the vortex mixing device 108 for mixing with the exhaust gases from the EGR conduit 106. The vortex mixing device 108 generates one or more vortices in the intake air. The vortices may form a vortex field. The vortex mixing device 108 directs the exhaust gases into the vortices in the vortex field. The exhaust gases mix with the intake air in the vortices and the vortex field to form the combustion gas. The combustion gas flows from the vortex mixing device 108 through the supply conduit 112 into the intake manifold 114 of the internal combustion engine 100.

Figure 2:
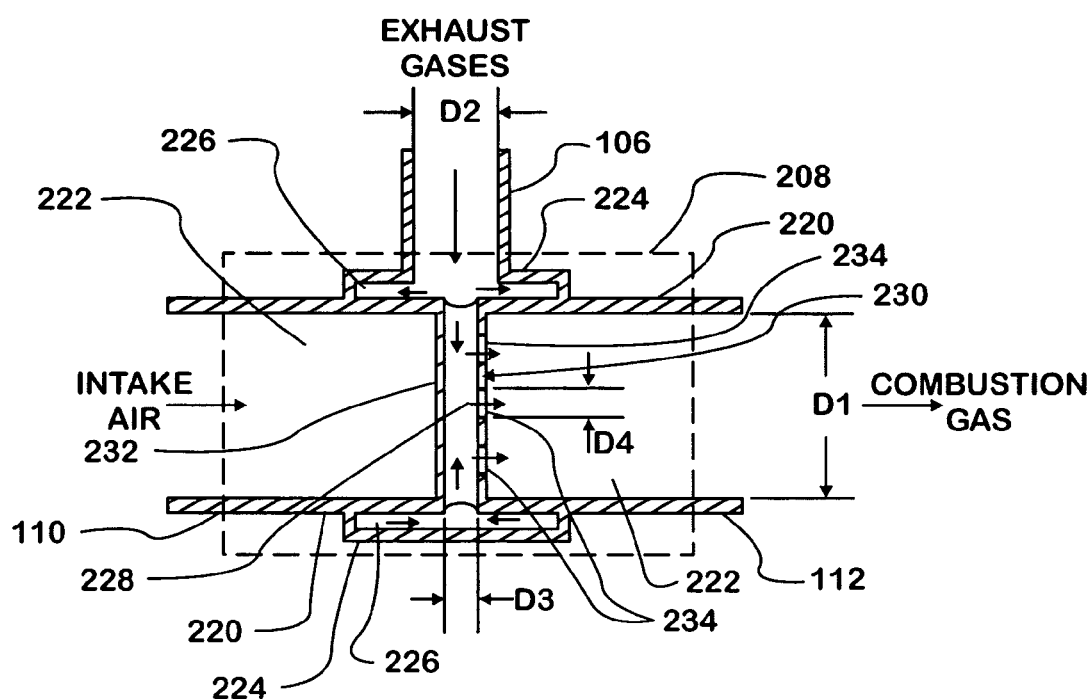
FIG. 2 is a side cross-section view of a vortex mixing device for the vortex mixing system of FIG. 1.
Figure 3:
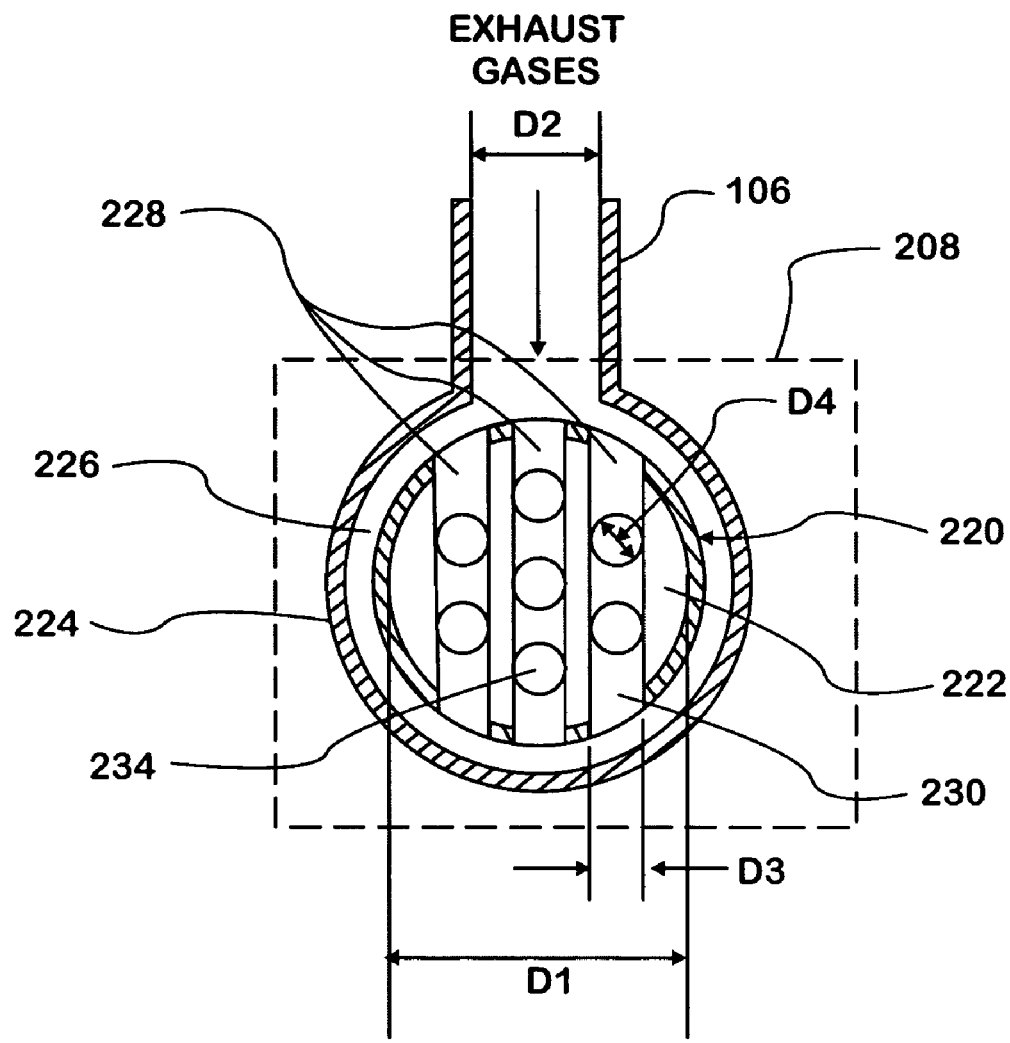
FIG. 3 is a top cross-section view of the vortex mixing device of FIG. 2.

FIGS. 2–3 are cross-section views of a vortex mixing device 208 for a vortex mixing system. The vortex mixing device 208 has a mixing conduit 220 that connects to the intake air conduit 110 and to the supply conduit 112. The mixing conduit 220 has essentially the same inside diameter as the intake air conduit 110 and the supply conduit 112. The mixing conduit 220 may be part or an extension of the intake air conduit 110, the supply conduit 112, or a combination thereof. The mixing conduit 220, the intake air conduit 110, and the supply conduit 112 may be the same component. The mixing conduit 220 forms a mixing chamber 222.

The mixing conduit 220 has a mixing conduit diameter, D1. The EGR conduit 106 has an EGR conduit diameter, D2. The ratio of the EGR conduit diameter to the mixing conduit diameter, D2:D1, may be greater than about 0.1 and less than about 0.75. The ratio of D2:D1 may be about 0.5. Other ratios of D2:D1 may be used.

The EGR conduit 106 connects to a plenum 224 disposed tangentially along the circumference of the mixing conduit 220. The plenum 224 forms an annular cavity 226 that surrounds a portion of the mixing conduit 220. The plenum 224 has one or more cross conduits 228 that span the mixing chamber 222. The plenum 224 may be connected to three or another number of cross conduits 228.

One or more of the cross conduits 228 may have a cross conduit diameter, D3. The mixing conduit 220 has a mixing conduit diameter, D1. The ratio of the cross conduit diameter to the mixing conduit diameter, D3:D1, may be greater than about 0.05 and less than about 0.45. The ratio of D3:D1 may be about 0.2. Other ratios of D3:D1 may be used.

Each cross conduit 228 extends across the mixing chamber 222 with both ends connected to the plenum 224. Each cross conduit 228 is essentially perpendicular to the mixing chamber 222. Multiple cross conduits 228 may be parallel to each other. The cross conduits 228 may be aligned with the EGR conduit 106 or may be aligned at an angle to the EGR conduit 106. Other arrangements of the cross conduits 226 may be used.

Each cross conduit 228 has an essentially cylindrical shape with a downstream side 230 opposite an upstream side 232. The downstream side 230 faces the connection of the supply conduit 112 with the mixing conduit 220. The upstream side 232 faces the connection of the intake air conduit 10 with the mixing conduit 220.

Each cross conduit 228 forms one or more outlets on the downstream side 230. The outlets are openings into the cross conduit 228 that direct the flow of exhaust gases into the mixing chamber 222. The outlets may be orifices 234 with the same or different shapes. The orifices 234 may have circular, angular, rectangular, a combination thereof, or like configurations. The cross conduits 228 may have seven or another number of orifices 234. The location of the cross conduits 228 and the location of the orifices 234 on the cross conduits 228 may position the orifices 234 substantially equidistant from each other. Other arrangements of the orifices 234 may be used.

One or more of the orifices 234 may have an orifice diameter, D4. The mixing conduit 220 has a mixing conduit diameter, D1. The ratio of the orifice diameter to the mixing conduit diameter, D4:D1, may be greater than about 0.02 and less than about 0.35. The ratio of D4:D1 may be about 0.18. Other ratios of D4:D1 may be used.

Figure 4:
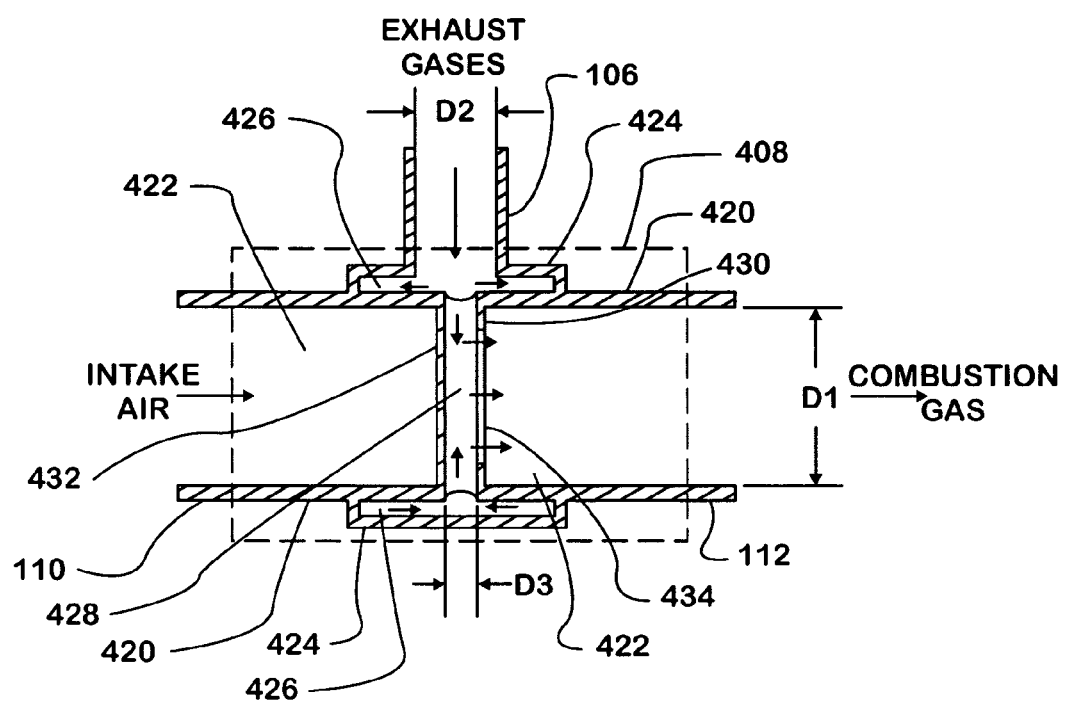
FIG. 4 is a side cross-section view of another vortex mixing device for the vortex mixing system of FIG. 1.
Figure 5:
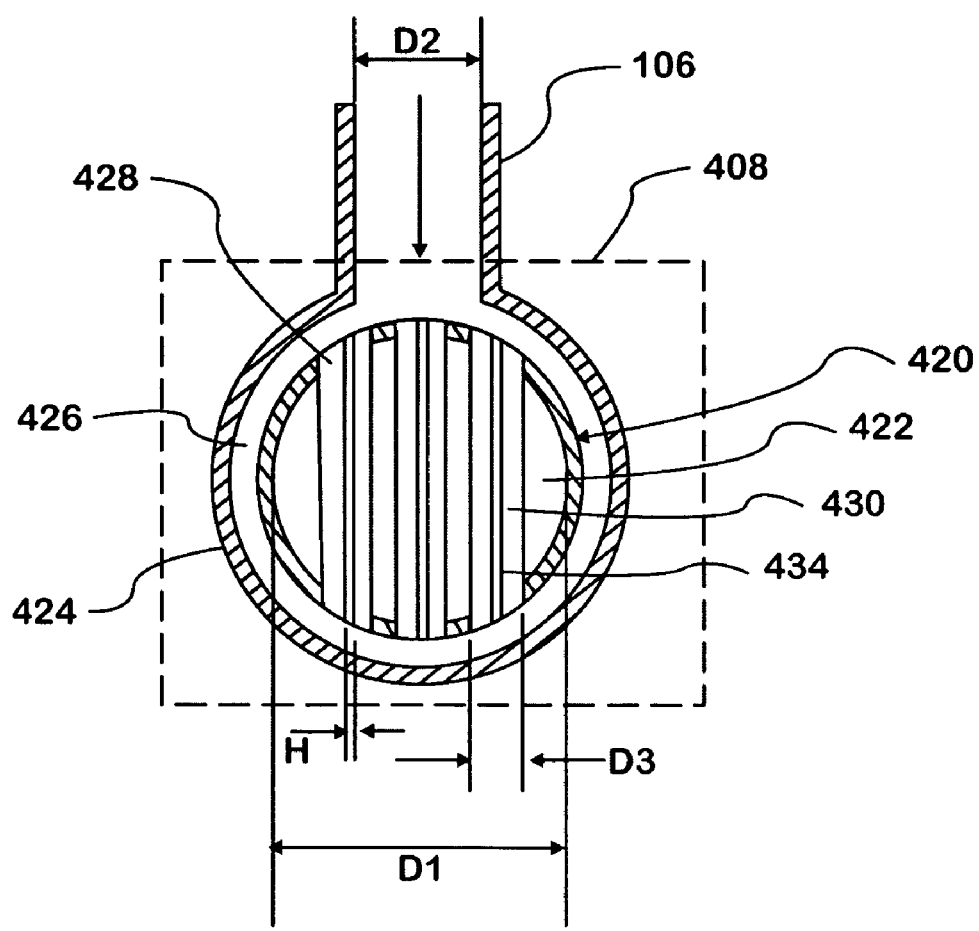
FIG. 5 is a top cross-section view of the vortex mixing device of FIG. 4.

FIGS. 4–5 are cross-section views of another vortex mixing device 408 for a vortex mixing system. The vortex mixing device 408 is substantially the same as the vortex mixing device 208 except that the outlets formed by the cross conduits 428 are slots 434.

The vortex mixing device 408 has a mixing conduit 420 that connects to the intake air conduit 110 and to the supply conduit 112. The mixing conduit 420 forms a mixing chamber 422. The mixing conduit 420 has an inside diameter, D1. The EGR conduit 106 has an inside diameter, D2. The ratios of the EGR conduit diameter to the mixing conduit diameter, D2:D1, may be the same as previously discussed.

The EGR conduit 106 connects to a plenum 424 that forms an annular cavity 426 surrounding the mixing conduit 420. The plenum 424 has one or more cross conduits 428 that span the mixing chamber 422. The plenum 424 may be connected to three or another number of cross conduits 428. Each cross conduit 428 has an inside diameter, D3. The mixing conduit 420 has an inside diameter, D1. The ratios of the cross conduit diameter to the mixing conduit diameter, D3:D1, may be the same as previously discussed. Each cross conduit 428 has an essentially cylindrical shape with a downstream side 430 opposite an upstream side.

Each cross conduit 428 forms one or more outlets on the downstream side 430. The outlets may be slots 434 with the same or different shapes. The slots 434 may have a narrow rectangular or like configuration. A narrow rectangular configuration may have two longer sides in parallel adjacent to two shorter sides opposite each other. The shorter sides may have an essentially straight or circular shape. The shorter sides may be convex, concave, or a combination thereof. The cross conduits 428 may have three or another number of slots 434. The location of the cross conduits 428 and the location of the slots 434 on the cross conduits 428 may position the slots 434 substantially equidistant from each other. Other arrangements of the slots 434 may be used.

One or more of the slots 434 may have a rectangular shape with a slot width, H. The mixing conduit 420 has an inside diameter, D1. The ratio of the slot width to the mixing conduit diameter, H:D1, may be greater than about 0.01 and less than about 0.25. The ratio of H:D1 may be about 0.05. Other ratios of H:D1 may be used.

In operation and referring to FIGS. 2–5, the exhaust gases flow from the EGR conduit 106 into the annular cavity 226 or 426 formed by the plenum 224 or 424. The exhaust gases flow from the annular cavity 226 or 426 through the cross conduits 228 or 428. The exhaust gases may enter each cross conduit 228 or 428 from either or both ends. The plenum 224 or 424 may substantially equalize the pressure and flow of exhaust gases through the cross conduits 228 or 428. The exhaust gases flow through the orifices 234 or the slots 434 into the mixing chamber 222 or 422.

As exhaust gases flow from the EGR conduit 106 to the mixing chamber 222 or 422, intake air flows through the intake air conduit 110 into the mixing chamber 222 or 422. As the intake air flows past the cross conduits 228 or 428, the intake air engages and flows around the cross conduits 228 or 428. On each cross conduit 228 or 428, the intake air forms a boundary layer along the surface of the upstream side 232 or 432. The pressure at the boundary layer decreases gradually as the intake air moves along the upstream side 232 or 432 toward the downstream side 230 or 430. The boundary layer stays attached to the cross conduit 228 or 428 while the pressure decreases.

As the intake air moves from the upstream side 232 or 432 to the downstream side 230 or 430 of the cross conduit 228 or 428, the pressure reaches a minimum pressure and starts to increase. The pressure at the boundary layer increases gradually as the intake air moves along the downstream side 230 or 430 away from the upstream side 232 or 432. The increasing pressure causes the boundary layer to separate from the downstream side 230 or 430. As the boundary layer separates, the intake air forms a vortex that detaches from the downstream side 230 or 430. Each cross conduit 228 or 428 may generate one or more vortices as the intake air flows from the upstream side 232 or 432 to the downstream side 230 or 430.

The vortices may create different types of vortex fields adjacent to the downstream sides 230 or 430 of the cross conduits 228 or 428. The vortices may create one or more individual vortex fields each adjacent to the downstream side 230 or 430 of a cross conduit 228 or 428. The vortices may create one or more group vortex fields each adjacent to multiple cross conduits 228 or 428. The vortices may create a combination of one or more group vortex fields with one or more individual vortex fields. The number and type of vortex fields may vary.

Each vortex field mixes exhaust gases with intake air to form the combustion gas for the cylinders in the engine. The exhaust gases flow out of the orifices 234 or slots 434 into the vortex field adjacent to the cross conduit 228 or 428. Each vortex is a mass of swirling intake air that draws the exhaust gases and/or other intake air toward the center of the vortex. The vortices also may generate a more turbulent wake that mixes exhaust gases with the intake air. The combustion gas flows from the mixing chamber 222 or 422 into the supply conduit 112.

Figure 6:
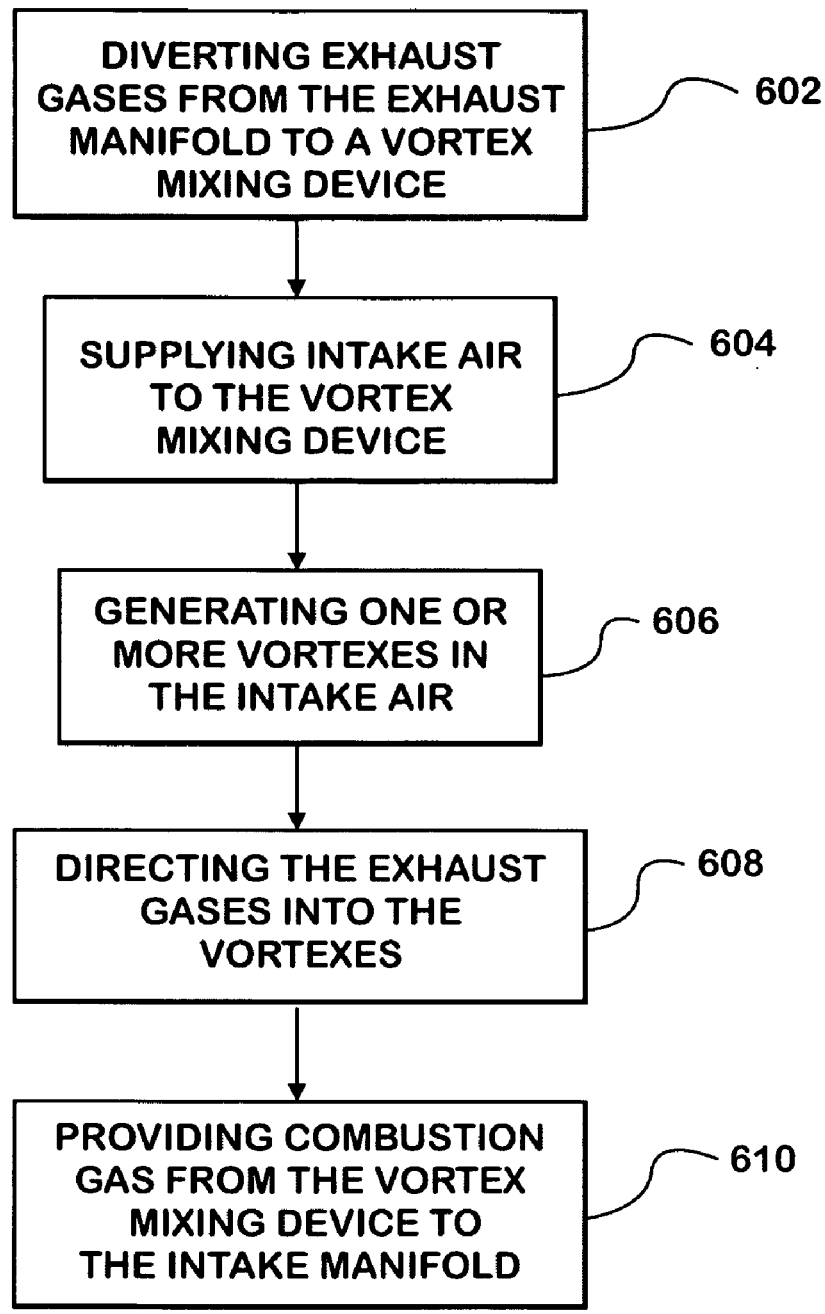
FIG. 6 is a flowchart of a method for mixing exhaust gases with intake air in an internal combustion engine.

FIG. 6 is a flowchart of a method for mixing exhaust gases with intake air in an internal combustion engine. The exhaust gases are directed into one or more vortices generated in the intake air as previously discussed.

In block 602, the exhaust gases are diverted from the exhaust manifold to a vortex mixing device. The exhaust gases exit the cylinders in the internal combustion engine and accumulate in the exhaust manifold. The exhaust gases flow from the exhaust manifold through an exhaust conduit to exit the engine. The exhaust conduit may be connected to a turbine inlet for the exhaust gases to pass through the turbine portion of a turbocharger prior to exiting. An EGR conduit connects the exhaust conduit to the vortex mixing device. The EGR conduit diverts a portion of the exhaust gases from the exhaust conduit to the vortex mixing device. The amount of exhaust gases diverted to the vortex mixing device may be controlled to provide a selected concentration of exhaust gases in the intake air. The selected concentration may vary during engine operation. Other exhaust gas recirculation systems including those with additional components may be used to divert a portion of the exhaust gases to the vortex mixing device.

In block 604, intake air is supplied to the vortex mixing device. An intake air conduit is connected to the vortex mixing device. Intake air flows through the intake air conduit to the vortex mixing device. The intake air conduit may be connected to the compressor side of a turbocharger.

In block 606, a vortex mixing device generates one or more vortices in the intake air. As the intake air flows past the upstream side of one or more cross conduits, the intake air forms a boundary layer along the surface of each cross conduit. As the intake air flows past the downstream side of each cross conduit, the boundary layer separates from the downstream side and forms one or more vortices. The vortices separate from the cross conduit and form one or more vortex fields adjacent to the downstream side.

In block 608, the exhaust gases are directed into the vortices. Each cross conduit in the vortex mixing device has one or more outlets. The outlets may be slots, orifices, or other openings formed on the downstream side of the cross conduit. The outlets direct the flow of exhaust gases into the vortices. The swirling action of the vortices draws the exhaust gases into the center of the vortex. The exhaust gases mix with the intake air in the vortices and also mix with the more turbulent intake air in the vortex fields. The mixture of exhaust gases and intake air forms the combustion gas for combustion of fuel in the cylinders of the engine.

In block 610, the combustion gas is provided to the intake manifold of the engine. A supply conduit connects the vortex mixing device to the intake manifold. The combustion gas flows from the vortex mixing device to the intake manifold.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed:

1. A mixing system for exhaust gas recirculation (EGR) in an internal combustion engine, comprising:
    a mixing conduit forming a mixing chamber;
    an intake air conduit connected to the mixing conduit;
    a supply conduit connected to the mixing conduit;
    a plenum disposed on the circumference of the mixing conduit, wherein the plenum forms an annular cavity;
    an EGR conduit connected to the plenum; and
    at least one cross conduit disposed across the mixing chamber, wherein each cross conduit is connected at both ends to the plenum, wherein each cross conduit has an upstream side and a downstream side, wherein the upstream side faces the intake air conduit, wherein the downstream side faces the supply conduit, and wherein each cross conduit forms at least one outlet on the downstream side.

2. The mixing system of claim 1,
    wherein the mixing conduit has a mixing conduit diameter;
    wherein the EGR conduit has an EGR conduit diameter;
    wherein the ratio of the EGR conduit diameter to the mixing conduit diameter is greater than about 0.1; and
    wherein the ratio of the EGR conduit diameter to the mixing conduit diameter is less than about 0.75.

3. The mixing system of claim 2, wherein the ratio of the EGR conduit diameter to the mixing conduit diameter is about 0.5.

4. The mixing system of claim 1,
    wherein the mixing conduit has a mixing conduit diameter;
    wherein the at least one cross conduit has a cross conduit diameter;
    wherein the ratio of the cross conduit diameter to the mixing conduit diameter is greater than about 0.05; and
    wherein the ratio of the cross conduit diameter to the mixing conduit diameter is less than about 0.45.

5. The mixing system of claim 4, wherein the ratio of the cross conduit diameter to the mixing conduit diameter is about 0.2.

6. The mixing system of claim 1, wherein the at least one outlet is an orifice.

7. The mixing system of claim 6,
    wherein the mixing conduit has a mixing conduit diameter;
    wherein each orifice has an orifice diameter;
    wherein the ratio of the orifice diameter to the mixing conduit diameter is greater than about 0.02; and
    wherein the ratio of the orifice diameter to the mixing conduit diameter is less than about 0.35.

8. The mixing device of claim 7, wherein the ratio of the orifice diameter to the mixing conduit diameter is about 0.18.

9. The mixing system of claim 1, wherein the at least one outlet is a slot.

10. The mixing system of claim 9,
    wherein the mixing conduit has a mixing conduit diameter;
    wherein at least one slot has a slot width;
    wherein the ratio of the slot width to the mixing conduit diameter is greater than about 0.01; and
    wherein the ratio of the slot width to the mixing conduit diameter is less than about 0.25.

11. The mixing system of claim 10, wherein the ratio of the slot width to the mixing conduit diameter is about 0.05.

12. The mixing system of claim 1, further comprising:
    an exhaust conduit connected to the EGR conduit;
    an exhaust manifold connected to the exhaust conduit; and
    an intake manifold connected to the supply conduit.

* * * * *